United States Patent
Jankovic et al.

(10) Patent No.: US 11,796,007 B2
(45) Date of Patent: Oct. 24, 2023

(54) CONNECTING DEVICE FOR THE RIGID CONNECTION OF TWO SHAFTS, AND SHAFT ARRANGEMENT WITH A CONNECTING DEVICE

(71) Applicant: KRISTL, SEIBT & CO. GESELLSCHAFT M.B.H., Graz (AT)

(72) Inventors: Darko Jankovic, Graz (AT); Christoph Neumayer, Graz (AT); Tihomir Marjanovic, Graz (HR)

(73) Assignee: KRISTL, SEIBT & CO. GESELLSCHAFT M.B.H., Graz (AT)

( * ) Notice: Subject to any disclaimer, the term of this patent is extended or adjusted under 35 U.S.C. 154(b) by 0 days.

(21) Appl. No.: 17/754,142

(22) PCT Filed: Dec. 18, 2020

(86) PCT No.: PCT/AT2020/060477
§ 371 (c)(1),
(2) Date: Mar. 24, 2022

(87) PCT Pub. No.: WO2021/119709
PCT Pub. Date: Jun. 24, 2021

(65) Prior Publication Data
US 2022/0290724 A1 Sep. 15, 2022

(30) Foreign Application Priority Data
Dec. 20, 2019 (AT) .............................. A 51150/2019

(51) Int. Cl.
*F16D 1/116* (2006.01)
*F16D 1/10* (2006.01)
(52) U.S. Cl.
CPC ........ *F16D 1/116* (2013.01); *F16D 2001/103* (2013.01)

(58) Field of Classification Search
CPC .. F16B 21/165; F16B 21/186; F16B 2200/50; F16B 2200/506; F16D 1/033;
(Continued)

(56) References Cited

U.S. PATENT DOCUMENTS 2,990,189 A 6/1961 Beers
3,240,504 A * 3/1966 Adams ...................... F16D 1/10
279/75
(Continued)

FOREIGN PATENT DOCUMENTS

DE 3340130 C1 3/1985
DE 3501262 C1 7/1986
(Continued)

OTHER PUBLICATIONS

ISA European Patent Office, International Search Report Issued in Application No. PCT/AT2020/060477, dated Mar. 30, 2021, WIPO, 6 pages.

*Primary Examiner* — Josh Skroupa
(74) *Attorney, Agent, or Firm* — McCoy Russell LLP

(57) ABSTRACT

A connecting device for the connection of mechanical shaft parts with a first connector section for connection to a first shaft part, a second connector section for connection to a second shaft part, and a locking mechanism. The first connector section can be connected to a mating section of the first shaft part for the transmission of torque. The locking mechanism, which is functionally independent of the transmission of torque and includes at least one displaceable element, prevents the release of the first connector section from the mating section of the first shaft part. The displaceable element of the locking mechanism can be moved between a release position, in which the first connector section can be released from the mating section, and a blocking position, which prevents release of the mating (Continued)

section from the first connector section. In some aspects, the locking mechanism may include an annular actuating element.

16 Claims, 5 Drawing Sheets

(58) Field of Classification Search
CPC . F16D 1/076; F16D 1/10; F16D 1/108; F16D 1/116; F16D 2001/103; Y10S 403/04; Y10S 464/901; Y10T 403/58; Y10T 403/581; Y10T 403/587; Y10T 403/7031; Y10T 403/7032; Y10T 403/7035
See application file for complete search history.

(56) References Cited

U.S. PATENT DOCUMENTS

| | | | | |
|---|---|---|---|---|
| 3,750,424 | A * | 8/1973 | Nettleton | F16D 1/101 |
| | | | | 403/359.4 |
| 4,392,759 | A * | 7/1983 | Cook | F16D 1/116 |
| | | | | 403/359.3 |
| 5,688,176 | A * | 11/1997 | Heidenreich | F16D 7/027 |
| | | | | 464/48 |
| 5,855,451 | A * | 1/1999 | Milton | F16D 1/0894 |
| | | | | 403/328 |
| 8,424,879 | B2 * | 4/2013 | Reinauer | B23B 31/1072 |
| | | | | 279/137 |
| 8,920,063 | B1 * | 12/2014 | Easley | F16B 21/165 |
| | | | | 403/328 |
| 10,480,587 | B2 * | 11/2019 | Knuth | F16D 1/108 |
| 2004/0126182 | A1 | 7/2004 | Lin | |
| 2012/0027509 | A1 * | 2/2012 | Leutwiler | F16L 55/07 |
| | | | | 403/319 |

FOREIGN PATENT DOCUMENTS

| | | | |
|---|---|---|---|
| DE | 3802849 C1 | 6/1989 | |
| DE | 3818808 A1 | 12/1989 | |
| DE | 3608739 C1 * | 7/1995 | ............ F16D 1/116 |
| DE | 4410306 C1 * | 7/1995 | ............ F16D 1/116 |
| DE | 4410306 C1 | 7/1995 | |
| DE | 102015106018 A1 | 10/2016 | |
| DE | 202017100289 U1 | 3/2017 | |
| EP | 3044142 B1 * | 12/2017 | ............ F16D 1/108 |
| JP | S5437403 U | 3/1979 | |
| WO | 2013052976 A1 | 4/2013 | |
| WO | 2017013146 A1 | 1/2017 | |
| WO | 2017013147 A1 | 1/2017 | |
| WO | 2018134322 A1 | 7/2018 | |

* cited by examiner

CONNECTING DEVICE FOR THE RIGID CONNECTION OF TWO SHAFTS, AND SHAFT ARRANGEMENT WITH A CONNECTING DEVICE

CROSS REFERENCE TO RELATED APPLICATIONS

The present application is a U.S. National Phase of International Application No. PCT/AT2020/060477 entitled "CONNECTING DEVICE FOR THE RIGID CONNECTION OF TWO SHAFTS, AND SHAFT ARRANGEMENT WITH A CONNECTING DEVICE," and filed on Dec. 18, 2020. International Application No. PCT/AT2020/060477 claims priority to Austrian Patent Application No. A 51150/2019 filed on Dec. 20, 2019. The entire contents of each of the above-listed applications are hereby incorporated by reference for all purposes.

TECHNICAL FIELD

The disclosure relates to a connecting device for the connection of mechanical shaft parts, having a first connector section for connection to a first shaft part, and a second connector section for connection to a second shaft part, wherein the first connector section is connectable in a positive locking manner to a mating section of the first shaft part for the transmission of torque, wherein a locking mechanism, which may be functionally independent of the transmission of torque, is provided on the connecting device, said locking mechanism having at least one displaceable blocking element, which is transferable between a release position, in which the first connector section is releasable from the mating section, and a blocking position, in which a release of the mating section from the first connector section is prevented in a positively locking manner by way of the blocking element. Furthermore, the disclosure relates to a shaft arrangement with this type of connecting device.

BACKGROUND AND SUMMARY

When testing vehicle drivetrains on test rigs, the connecting shafts between test wheels and loading machines have been fixed using screws up to now. This type of connection has a low susceptibility to errors and withstands high loads. However, it is disadvantageous that the set up of the test object on the test rig is linked to an increased expenditure of time and labor, as each connecting shaft has to be individually screwed. In addition, it is not possible with this type of connection to quickly separate the test object in the case of error. However, a rapid separation is necessary, for example, in case the test object catches fire and must therefore be removed immediately from the test rig.

In addition to the previously mentioned connection type by means of screws, shaft-hub connections are known from the prior art, in which a positively locking connection for the transmission of torque may be established between two elements by means of feather keys or connecting bolts or connecting pins. However, this type of connection is likewise not quickly releasable in the case of error.

Furthermore, a releasable connection is known from WO 2018/134322 A1. WO 2018/134322 A1 discloses a different type of diving scooter for underwater sports with a propeller, wherein a ball lock pin is provided for releasable connection to a drive shaft. Since the ball lock pin is fixedly arranged on the propeller, no shaft parts of a vehicle drivetrain or a test rig may be quickly connected to each other or released from one another using the device from WO 2018/134322 A1.

Connecting devices for the connection of mechanical shaft parts are also known from the prior art from DE 3802849 C1, DE 3818808 A1, and WO 2017/013146 A1.

In light of these statements, it is therefore the object of the present disclosure to at least partially alleviate or completely eliminate the disadvantages of the prior art. It is the object of the disclosure to provide a connecting device for quick and easy connection of two shaft parts, which may permit a quick separation between the shaft parts in the case of error.

This problem is solved by a connecting device with the features according to the disclosure. According to the disclosure, a connecting device of the type specified at the outset is therefore provided, in which the blocking mechanism has at least one displaceable locking pin, which, in a fixing position, secures the blocking element in the blocking position, and, in a tripped position, permits a transfer of the blocking element into the release position. Due to the locking mechanism, an unintentional separation of the positively locking connection for transmission of torque is prevented between the first shaft part and the connecting device. As needed, for example, in the case of error, however, the form-fit connection between the first connector section and the mating section may immediately be released by transferring the blocking element from the blocking position into the release position, and this may also be released, as needed, even during the rotation of the two shaft parts. A connection of the mating section to the first connector section is also quickly and easily possible. The blocking element may be displaceable between the release position and the blocking position. In one embodiment of the disclosure, the locking mechanism or the blocking element is functionally independent from the transmission of torque. That means that the locking mechanism does not contribute to the transmission of torques between the shaft parts, and therefore, a transmission of torque might also occur without the locking mechanism. However, without the locking mechanism, a separation of the first shaft part from the connecting device would be possible at any time, which would present a substantial safety risk. In normal operation, i.e., when no error occurs, a separation of the first shaft part from the connecting device should therefore be able to be prevented by the locking mechanism. The release of the first connector section from the mating section may take place in the axial direction, i.e., parallel to the axis of rotation. In the blocking position, the blocking element is equipped accordingly to block a release of the mating section from the first connector section in a direction parallel to the axis of rotation. The first connector section may be designed as a connector flange or a connector ring. The blocking element may be arranged at least partially within the connector flange or within the connector ring. To transmit torque by means of the form-fit connection, the first connector section may have a toothing, such as an involute toothing. It is favorable if the toothing is thereby an internal toothing and/or an external toothing. The toothing may be designed as an internal or external toothing according to DIN 5480-1 (March 2006). The first connector section and the mating section may then be connected for this specific embodiment in the connected state via a toothed shaft connection according to DIN 5480-1 (March 2006). The shaft parts may be, among other things, shafts, shaft stubs, axles, or the like. The first and the second shaft part may also be considered to be two separate parts of the same shaft or axel, which are connected to one another via the connecting device. The second shaft part may be connected via the second connector section to the connecting device by means of a force fit and/or a friction connection. The first and the second connector sections may be arranged on opposite sides of the connecting device. In one refinement of the disclosure, the locking mechanism may be remotely controlled and for example, electrically, hydraulically, and/or pneumatically transferred between the release position and the blocking position.

According to one embodiment, the locking mechanism has at least two, for instance, at least three or four blocking elements. If the first connector section is designed as a connector ring or connector flange, it is useful if the blocking elements can be arranged spaced regularly apart from one another along the periphery of the connector ring or connector flange. The connecting device may comprise metal, such as steel.

In one embodiment, the blocking element is formed by a ball, which may be stored in a ball channel arranged substantially radial to the axis of rotation. The ball channel permits a displacement of the ball from the blocking position into the release position and vice versa. The ball channel may be designed as elongated and may have an inner diameter that is slightly larger in comparison to the outer diameter of the ball. If multiple blocking elements are provided, each ball is mounted in its own ball channel.

The first connector section may have a toothing region and the ball channel may open into the toothing region via a channel opening, wherein the channel opening may have a smaller cross section than the ball. The ball may project through the channel opening at least partially into the toothing region in the blocking position, and thus prevent a release of the mating section of the first shaft part from the first connector section of the connection device, for instance, in the axial direction. The mating section may have a corresponding counter toothing.

According to the disclosure, the locking mechanism has at least one displaceable locking pin, which, in a fixing position, secures the blocking element in the blocking position and, in a tripped position, permits a transfer of the blocking element into the release position. The locking pin may be oriented parallel or coaxial to the axis of rotation. The locking pin is displaceably mounted in the connecting device. A return spring may hold the locking pin in the fixing position, and the locking pin may be transferred into the tripped position by overcoming the spring force generated by the return spring. If the locking mechanism has multiple blocking elements, a locking pin can be assigned to each blocking element.

If the connecting device has a ball channel with a ball as the blocking element, it is useful if the locking pin projects into the ball channel, and, for instance, penetrates the same, and, in the fixing position, secures the ball in the blocking position. The ball may be clamped between the channel opening and the locking pin in the fixing position, wherein the ball may project at least partially through the channel opening. The longitudinal axis of the locking pin may run substantially at a right angle to the longitudinal axis of the ball channel.

In one embodiment, the locking pin has at least one first section with a first cross section and at least one second section with a second cross section, is the second cross section being smaller in comparison to the first cross section, wherein, in the fixing position, the locking pin projects into the ball channel with at least the first section, and secures the ball in the blocking position. A tapering transition area may be provided between the first and the second section.

In order to permit a quick release of the first connector section from the mating section, it is useful if the locking mechanism has a trip element, such as a release ring, due to whose actuation, the locking pin, such as all locking pins, is/are transferable from the fixing position into the tripped position. The locking pin(s) may be fixedly, for instance, rigidly connected to the trip element. The trip element may be connected to at least one return spring, by which the trip element is held in a first position. In the first position of the trip element, the locking pin(s) is/are held in the fixing position. By overcoming the spring force of the return spring, the trip element may be actuated, i.e., brought into a second position, by which means the locking pin(s) is/are transferred into the tripped position. After the force applied to overcome the spring force is removed again, the trip element is brought back into the first position by the return spring, and thus the locking pin(s) is/are brought into the fixing position. The trip element may be manually actuated, for example, by hand. Additionally or alternatively, the trip element may also be actuated by an electric tripping mechanism. In one possible refinement, the electric tripping mechanism may be remotely operated, for example, actuated via radio.

In one embodiment, at least two, or three blocking elements may be arranged substantially regularly about the axis of rotation and respectively corresponding locking pins are provided, said locking pins, in a fixing position, respectively secure the corresponding blocking element in the blocking position, and, in a tripped position, permit a transfer of the respectively corresponding blocking element into the release position, wherein the locking pins are transferable from the fixing position into the tripped position by means of a release ring arranged about the axis of rotation. In this embodiment, a trip element is correspondingly provided of the type described above in the form of a release ring.

In order to guarantee a safe transmission of torque, the first connector section may have a toothing region, which is connectable to a counter toothing of the first shaft part for the transmission of torque. The toothing region can be designed as self-contained, i.e., continuous. The channel opening of the ball channel may open into the toothing region. The channel opening may be arranged between teeth of the toothing region, or may at least partially disrupt one tooth or multiple teeth of the toothing region.

According to one embodiment, the toothing region may have a circumferential internal toothing and/or a circumferential external toothing. The toothing may be designed as an involute toothing. The toothing may be designed according to DIN 5480-1 (March 2006).

The first connector section can be designed as annular.

The problem mentioned at the outset is also solved by a shaft arrangement with a first shaft part and a second shaft part, which are releasably connected to one another via a connecting device of the abovementioned type. The second shaft part may be connected to the connecting device in a non-positive and/or positively locking manner via the second connector section. Among other things, the second shaft part may be screwed to the connecting device. The second shaft part may be, for example, a drive shaft. The first shaft part may be, for example, an output shaft, a connector flange, or a shaft stub. The first and the second shaft parts may also be considered to be two separate parts of the same shaft, which are connected to each other via the connecting device. The first connector section and the mating section may be connected via a spline shaft connection for the transmission of torque according to DIN 5480-1 (March 2006).

The first connector section may have a toothing region and the mating section of the first shaft part may have an area with a counter toothing, wherein the counter toothing has teeth which are shorter than the teeth of the toothing region of the connecting device.

BRIEF DESCRIPTION OF THE FIGURES

The disclosure will subsequently be described with reference to the figures; however, it shall not be limited to the same.

in FIG. 5A, blocking elements are located in the blocking position and locking pins are located in the fixing position; in FIG. 5B, blocking elements are located in the release position and locking pins are located in the tripped position;

DETAILED DESCRIPTION

Figure 1:
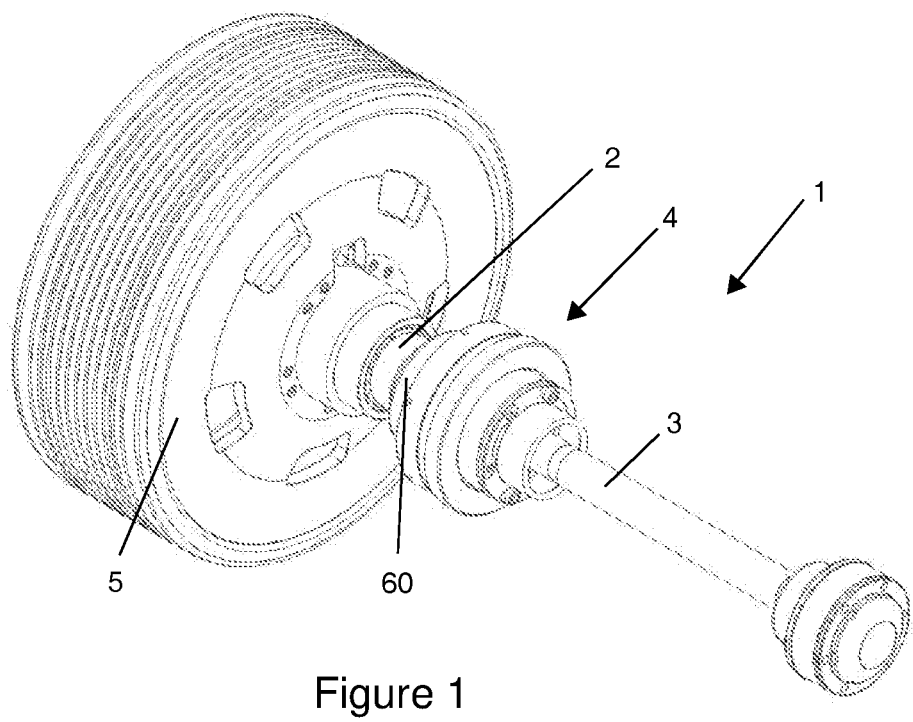
FIG. 1 shows an oblique view of a shaft arrangement with a first and a second shaft part, which are releasably connected to each other via a connecting device.

FIG. 1 shows a shaft arrangement 1 with a first shaft part 2 and a second shaft part 3. Both shaft parts 2, 3 are releasably connected to each other via a connecting device 4 according to the disclosure. In the depiction shown, first shaft part 2 is designed as a connector flange 60 and is connected to a test wheel 5 of a test rig. First shaft part 2 may be considered to be part of test wheel 5. Second shaft part 3 leads to a load machine (not shown). In order to be able to quickly separate test wheel 5 or first shaft part 2 from second shaft part 3, and thus from the load machine in the event of an error, both shaft parts 2, 3 are releasably connected to each other via connecting device 4.

Figure 2:
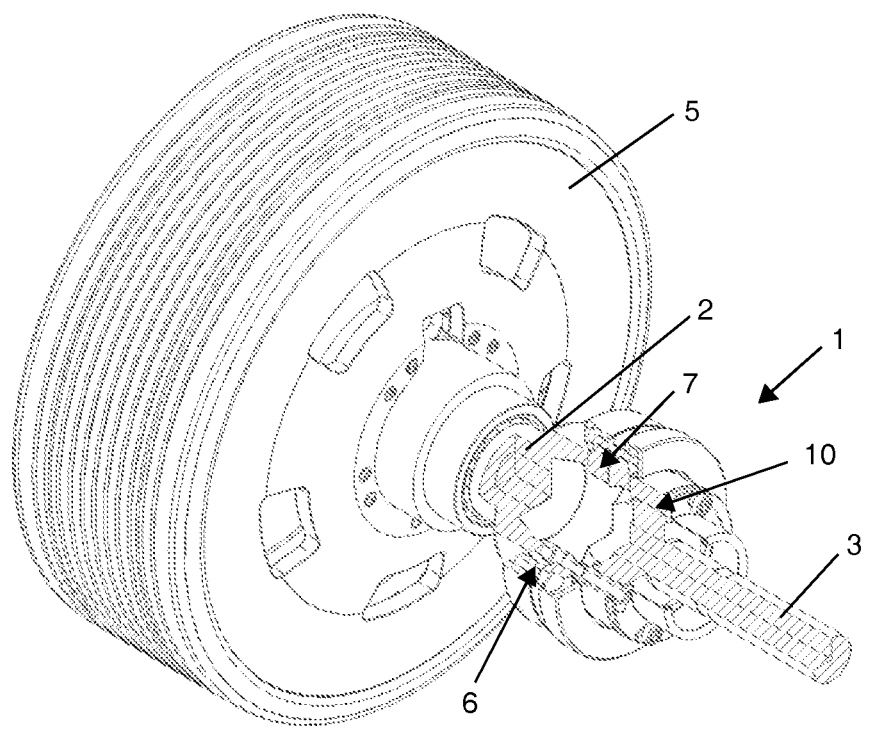
FIG. 2 shows the oblique view according to FIG. 1 with a sectional view of the connecting device.

FIG. 2 shows an enlarged and partially sectional depiction of connecting device 4 and both shaft parts 2 and 3 according to FIG. 1. Connecting device 4 is connected via a first connector section 6 of connecting device 4 in a positively locking manner to a corresponding mating section 7 of first shaft part 2 for the transmission of torque. The positively locking connection is present in each case in the direction of rotation. First connector section 6 in the embodiment shown has a toothing region 8 and mating section 7 has a corresponding counter toothing 9, with respective teeth 18 or 18' (see, for example, FIG. 4) for the positively locking connection of first connector section 6 to mating section 7. On the opposite side, connecting device 4 is connected via a second connector section 10 in a positively locking and/or friction locking manner to second shaft part 3.

Figure 3:
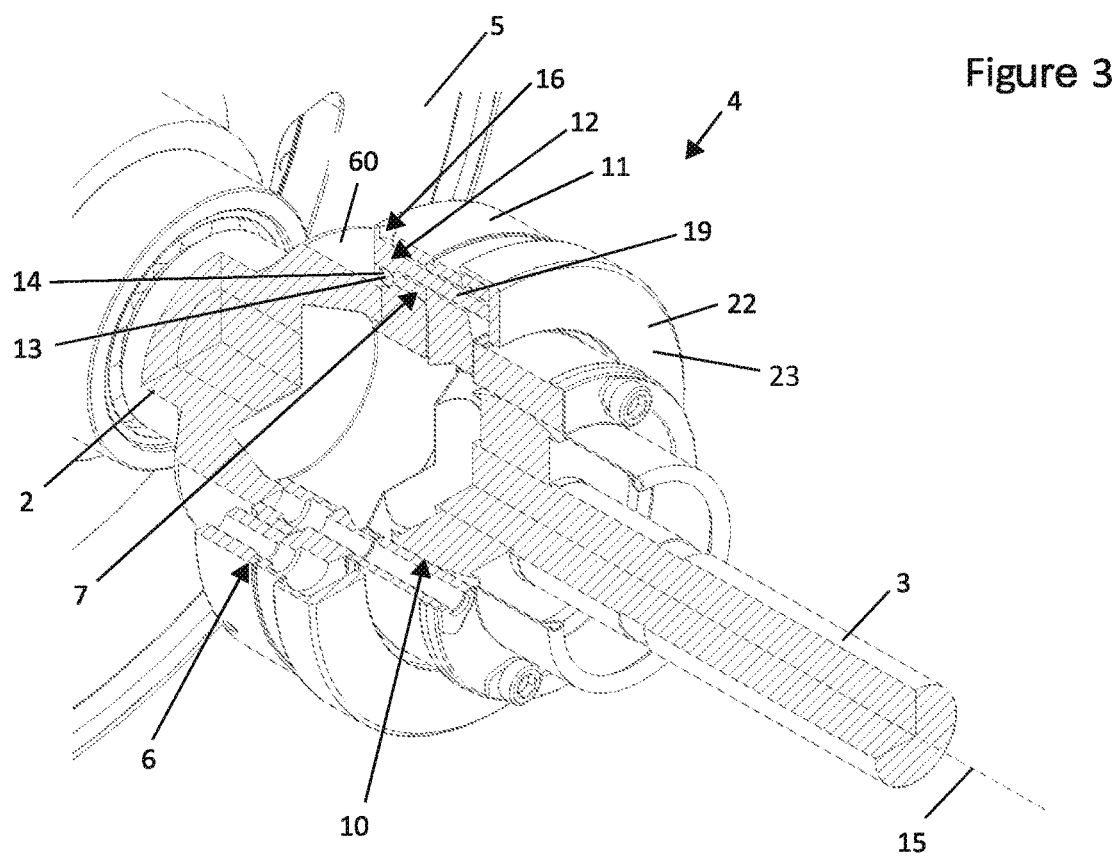
FIG. 3 shows a partial area from FIG. 2 in an enlarged depiction.

FIG. 3 shows an enlarged depiction of connecting device 4 from FIG. 2. It is clear that first connector section 6 is designed as a connector ring 11. In order to prevent an unintentional release of the positively locking connection between first shaft part 2 and connecting device 4 during normal operation, connecting device 4 according to the disclosure has a locking mechanism 12. Locking mechanism 12 comprises multiple blocking elements 13, which are arranged along the periphery of connector ring 11, for instance, spaced regularly apart from each other. According to the disclosure, blocking elements 13 are transferable between a blocking position (compare FIG. 5A), in which a release of mating section 7 from first connector section 6 is prevented in a positively locking manner by blocking elements 13, and a release position (compare FIG. 5B), in which first connector section 6 is releasable from mating section 7. In the embodiment shown, blocking elements 13 are formed by balls 14. Balls 14 are each mounted in their own ball channel 16, oriented substantially radially to axis of rotation 15 of shaft arrangement 1, said ball channel may be arranged in connector ring 11. In order to prevent a release of mating section 7 from first connector section 6, each ball channel 16 opens into toothing region 8 of connecting device 4 (more easily seen in FIG. 4) via a channel opening 17. In the blocking position, as they are shown, for example, in FIG. 5A, balls 14 project at least partially through channel openings 17 into toothing region 8 and thereby prevent, in a positively locking manner, an extraction of first shaft part 2 in the axial direction, i.e., parallel to axis of rotation 15, when mating section 7 is connected to first connector section 6.

Figure 4:
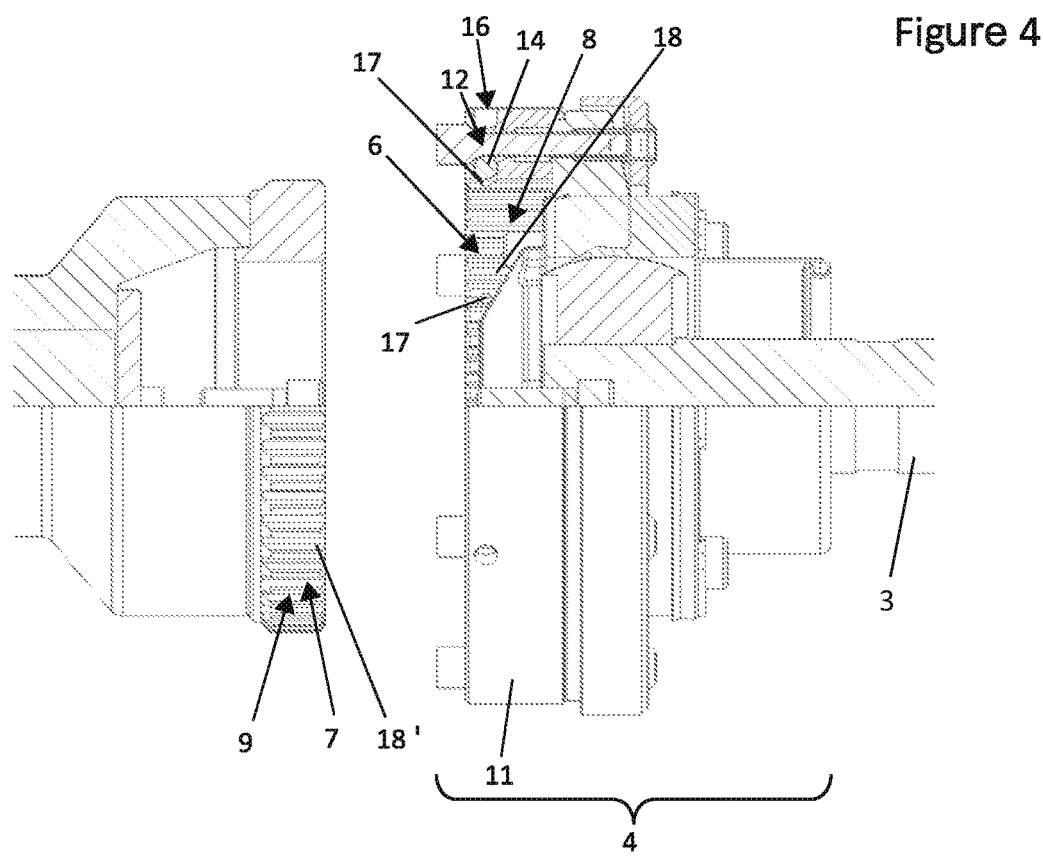
FIG. 4 shows a partial, sectional side view of the connecting device, wherein the blocking elements are located in a release position.
Figure 5A:
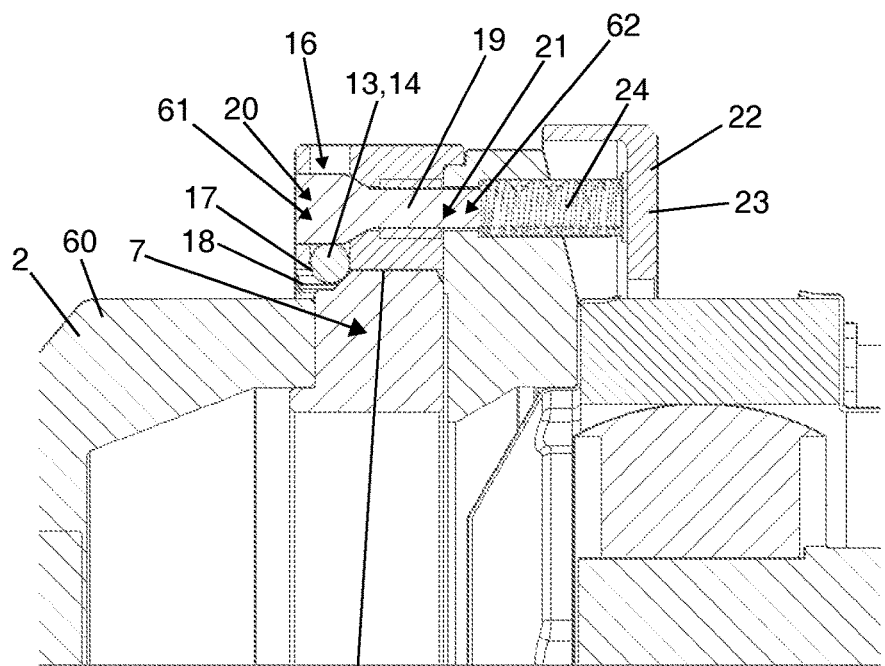
FIGS. 5A, 5B respectively show a sectional view of an upper half of the connecting device.
Figure 5B:
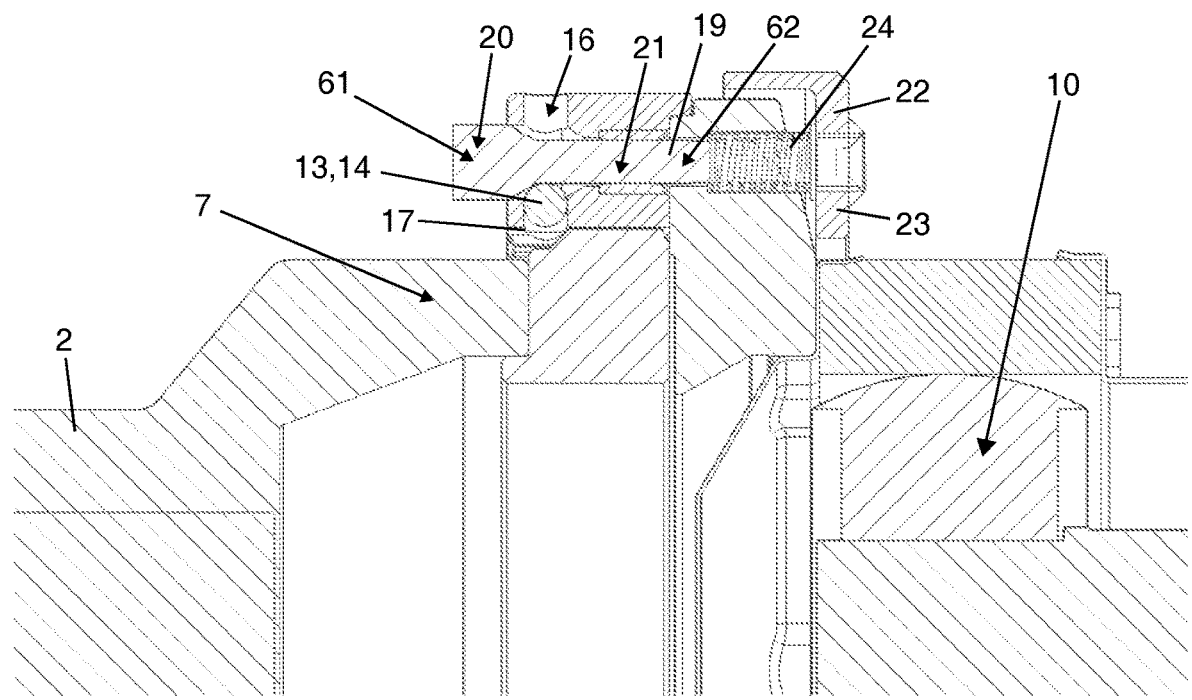

It is clear in FIG. 4 (and also partially in FIG. 5A and FIG. 5B), that teeth 18' of mating section 7 are shorter than teeth 18 of first connector section 6. When mating section 7 is completely inserted into first connector section 6, balls 14, located in the blocking position, project through channel openings 17 behind teeth 18' of mating section 7 on the side of first shaft part 2, when viewed in the direction of axis of rotation 15, and thus block a release of teeth 18' of mating section 7 from teeth 18 of first connector section 6. Balls 14 in the blocking position may partially contact flattened end faces of teeth 18' of mating section 7.

Locking mechanism 12 does not contribute in principle to the transmission of torque, but instead merely prevents a(n) (unintentional) separation of first shaft part 2 from connecting device 4 in a positively locking manner. Channel openings 17 may open into toothing region 8 between teeth 18 of toothing region 8. Channel openings 17 may also partially disrupt teeth 18 of toothing region 7. In any case, in the embodiment shown, balls 14 in the blocking position project at least partially into toothing region 8 and thus, as described above, prevent a release of counter toothing 9 in the connected state. In order to secure balls 14 against falling out, it is favorable if channel openings 17 have a smaller cross section than balls 14.

In order to secure blocking elements 13 in the blocking position, a displaceable locking pin 19 is provided for each blocking element 13. Depicted locking pins 19 have a first section 61 with a first cross section 20 and a second section 62 with a second cross section 21, the second cross section 21 being smaller in comparison to the first cross section, and may be displaced between a fixing position (compare FIG. 5A) and a tripped position (compare FIG. 5B). Locking pins 19 project at least partially laterally into ball channels 16 or cross the same. In the fixing position, locking pins 19 secure balls 14 in the blocking position. In the fixing position, locking pins 19 project with their first sections 61 into respective ball channels 16. Locking pins 19 thereby contact balls 14 with first (thicker) section 61 and clamp the balls between channel openings 17 and locking pins 19 in a non-displaceable and positively locking manner. In this position, the positively locking connection for transmission of torque between first shaft part 2 and connecting device 4 may not be released, since balls 14 prevent an extraction of mating section 7 from first connector section 6. By actuating a trip element 22, all locking pins 19 may be brought into the tripped position. Locking pins 19 are thereby displaced and pressed partially out of the housing of connecting device 4. In the tripped position of locking pins 19, blocking elements 13 or balls 14 are no longer undisplaceably clamped. In the tripped position, a separation is possible of the positively locking connection between mating section 7 and first connector section 6. As is clear in FIG. 5B, in the tripped position, locking pins 19 no longer project with their first sections 61 with first cross sections 20 into ball channels 16, but instead with second sections 62 with (smaller) second cross sections 21. Balls 14 may thus be displaced upward. This may be carried out in the embodiment shown, for example, by the extraction of first shaft part 2, by which means balls 14 are displaced outward in ball channel 16, i.e., away from axis of rotation 15, by the flattened end faces of teeth 18' of mating section 7.

In the embodiment shown, the trip element 22 is an annular actuating element 23, which is connected to all locking pins 19. Actuating element 23 is arranged about axis of rotation 15 and is held with the aid of at least one return spring 24 in one position, in which locking pins 19 are located in the fixing position. Return spring 24 is arranged concentrically about a locking pin 19 (and at least partially surrounds the same) in the depiction shown. In the case of multiple return springs 24, these may each be arranged concentrically about a locking pin 19. By actuating the actuating element 23 and overcoming the spring force, all locking pins 19 may be brought into the tripped position. Actuating element 23 may be tripped manually or by means of an electric tripping mechanism (not depicted).

Figure 6:
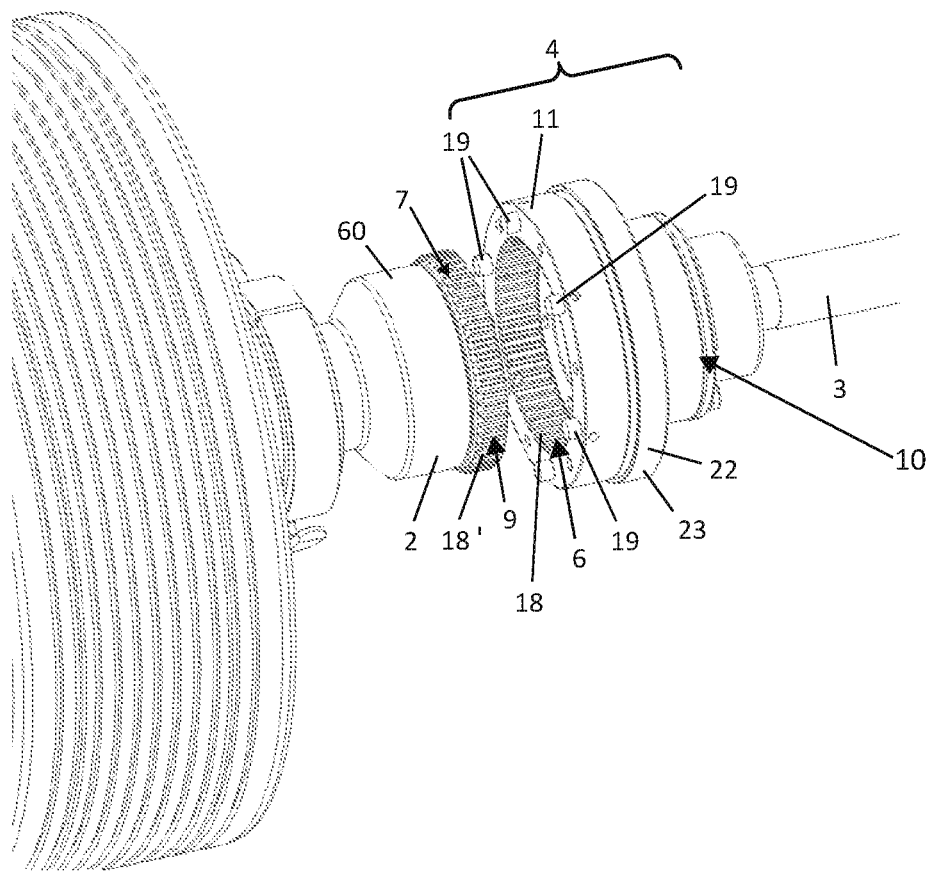
FIG. 6 shows a first shaft part and a second shaft part released from the same.

FIG. 6 shows a depiction, in which first shaft part 2 and connecting device 4 are separated from each other. Trip element 22 or actuating element 23 is thereby actuated, by which means locking pins 19 are located in the tripped position. In this position, mating section 7 of the first shaft part may be connected to first connector section 6. When trip element 22 is released after connecting mating section 7 to first connector section 6, and trip element 22 is brought back into the initial position due to the spring pressure exerted by return springs 24, locking pins 19 are transferred into the fixing position and blocking elements 13 are fixed in the blocking position. A release of mating section 7 from the first connector section is then no longer possible without actuating trip element 22. In other words, by actuating trip element 22, a connection and a separation are enabled for mating section 7 to first connector section 6.

Figure 7:
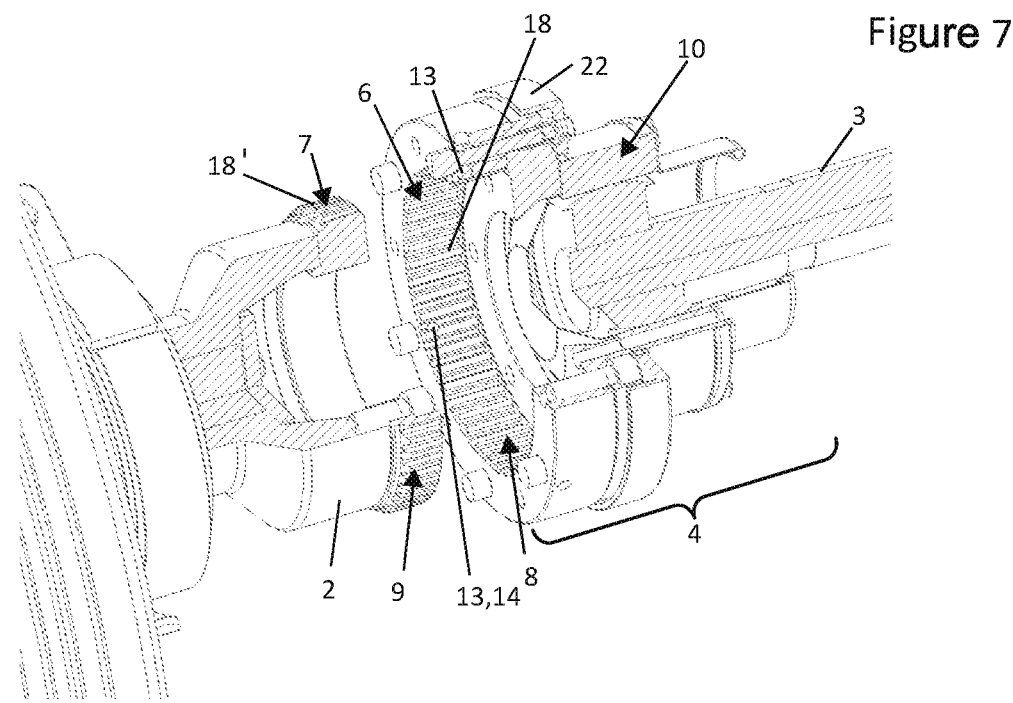
FIG. 7 schematically shows a partial area from FIG. 6 in a sectional and enlarged view.

FIG. 7 shows the depiction from FIG. 6 in an enlarged and partially sectional depiction.

Figure 8:
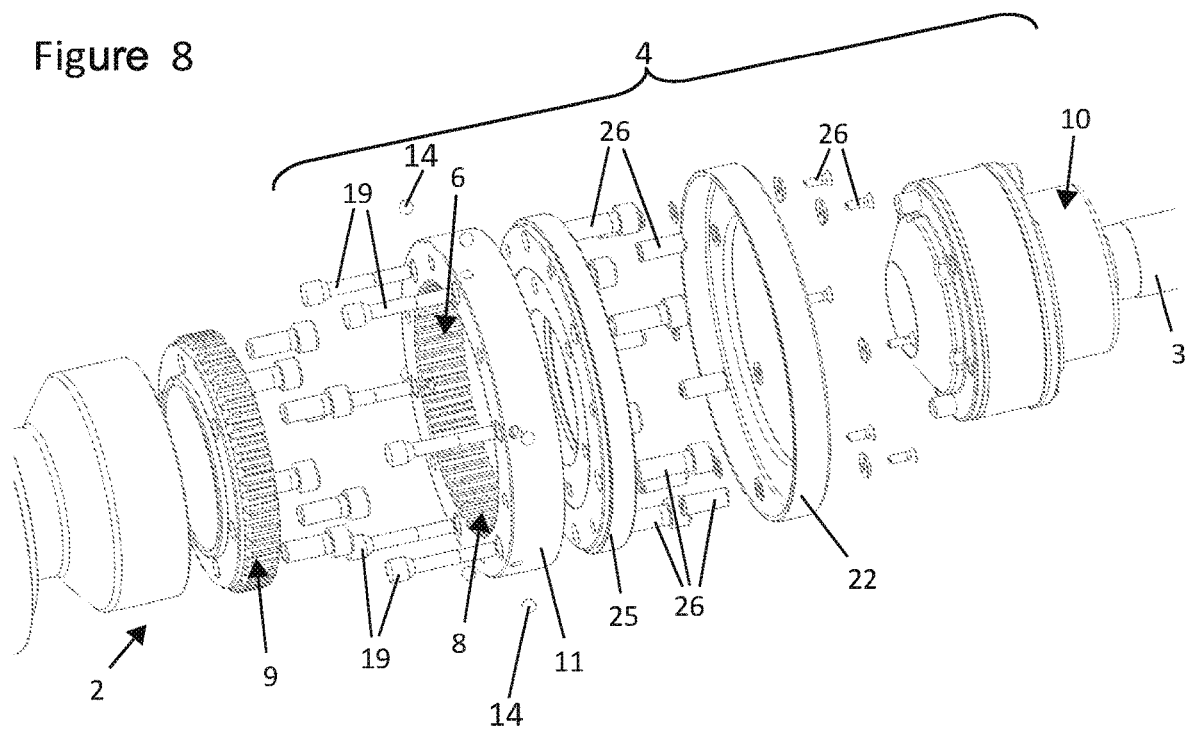
FIG. 8 shows an exploded depiction of the connecting device.
Figure 9:
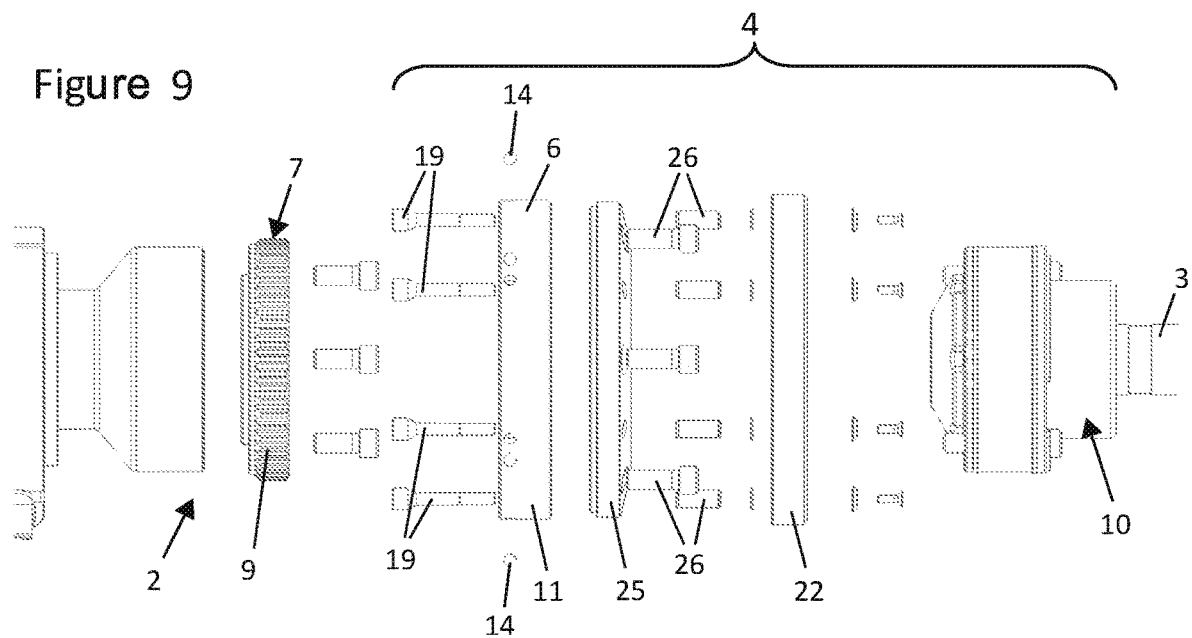
FIG. 9 shows the exploded depiction from FIG. 8 in a side view.

FIGS. 8 and 9 show exploded depictions of connecting device 4 according to the disclosure, wherein it is clear that first connector section 6 is designed as connector ring 11.

A further ring element 25 is on connector ring 11 (in the connected state) as an intermediate element which joins trip element 22 and second connector section 10. First connector section 6 and second connector section 10 and ring element 25 are connected to each other by means of connection means 26, such as screws and bolts.

FIGS. 1-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A connecting device for connection of mechanical shaft parts, the connecting device comprising:
    a first connector section configured to connect to a first shaft part, wherein the first connector section is connectable in a first positively locking manner to a mating section of the first shaft part, the first positively locking manner allowing for a transmission of torque,
    a second connector section configured to connect to a second shaft part,
    a locking mechanism, said locking mechanism comprising multiple displaceable blocking elements, which are transferable between a release position, in which the first connector section is releasable from the mating section, and a blocking position, in which a release of the mating section from the first connector section is prevented in a second positively locking manner by the displaceable blocking elements,
    wherein the displaceable blocking elements are formed by balls which are stored in ball channels,
    wherein the locking mechanism comprises multiple displaceable locking pins which, in a fixing position, secure the displaceable blocking elements in the blocking position, and, in a tripped position, permit a transfer of the displaceable blocking elements into the release position, wherein each of the multiple displaceable locking pins is assigned to one of the multiple displaceable blocking elements, wherein the locking mechanism comprises a trip element, due to whose actuation all multiple displaceable locking pins are transferable from the fixing position into the tripped position, and wherein the multiple displaceable locking pins are connected to the trip element.

2. The connecting device according to claim 1, wherein the first connector section has a toothing region and the ball channels open into the toothing region via channel openings.

3. The connecting device according to claim 2, wherein, in the blocking position, the balls project at least partially through the channel openings.

4. The connection device according to claim 2, wherein the channel openings have a smaller cross section than the balls.

5. The connecting device according to claim 1, wherein the displaceable locking pins project into the ball channels, and, in the fixing position, secure the balls in the blocking position.

6. The connecting device according to claim 5, wherein the displaceable locking pins have at least one first section with a first cross section and at least one second section with a second cross section, the second cross section being smaller in comparison to the first cross section, and wherein, in the fixing position, the displaceable locking pins project with at least the first section into the ball channels and secure the balls in the blocking position.

7. The connecting device according to claim 1, wherein the trip element is an annular actuating element.

8. The connecting device according to claim 1, wherein at least three of the displaceable blocking elements are arranged substantially regularly about an axis of rotation, wherein respectively corresponding locking pins are provided, and wherein the locking pins are transferable from the fixing position into the tripped position by an annular actuating element arranged about the axis of rotation.

9. The connecting device according to claim 1, wherein the first connector section has a toothing region which is connectable to a counter toothing of the first shaft part for the transmission of torque.

10. The connecting device according to claim 9, wherein the toothing region has an internal toothing and/or an external toothing.

11. The connection device according to claim 10, wherein the internal toothing and/or the external toothing is circumferential.

12. The connecting device according to claim 1, wherein the first connector section is annular.

13. A shaft arrangement with a first shaft part and a second shaft part, which are releasably connected to each other via a connecting device, wherein the connecting device comprises:

a first connector section configured to connect to a first shaft part, wherein the first connector section is connectable in a first positively locking manner to a mating section of the first shaft part, the first positively locking manner allowing for a transmission of torque, a second connector section configured to connect to a second shaft part, a locking mechanism, said locking mechanism comprising multiple displaceable blocking elements, which are transferable between a release position, in which the first connector section is releasable from the mating section, and a blocking position, in which a release of the mating section from the first connector section is prevented in a second positively locking manner by the displaceable blocking elements, wherein the displaceable blocking elements are formed by balls which are stored in ball channels, wherein the locking mechanism comprises multiple displaceable locking pins which, in a fixing position, secure the displaceable blocking elements in the blocking position, and, in a tripped position, permit a transfer of the displaceable blocking elements into the release position, wherein each of the multiple displaceable locking pins is assigned to one of the multiple displaceable blocking elements, wherein the locking mechanism comprises a trip element, due to whose actuation all multiple displaceable locking pins are transferable from the fixing position into the tripped position, and wherein the multiple displaceable locking pins are connected to the trip element.

14. The shaft arrangement according to claim 13, wherein the first connector section has a toothing region and the mating section of the first shaft part has an area with a counter toothing, and wherein the counter toothing comprises teeth which are shorter than the teeth of the toothing region of the connecting device.

15. The connecting device according to claim 1, wherein the locking mechanism is functionally independent of the transmission of torque.

16. The connection device according to claim 1, wherein the ball channels are arranged substantially radially to an axis of rotation.

* * * * *